Figure 1:
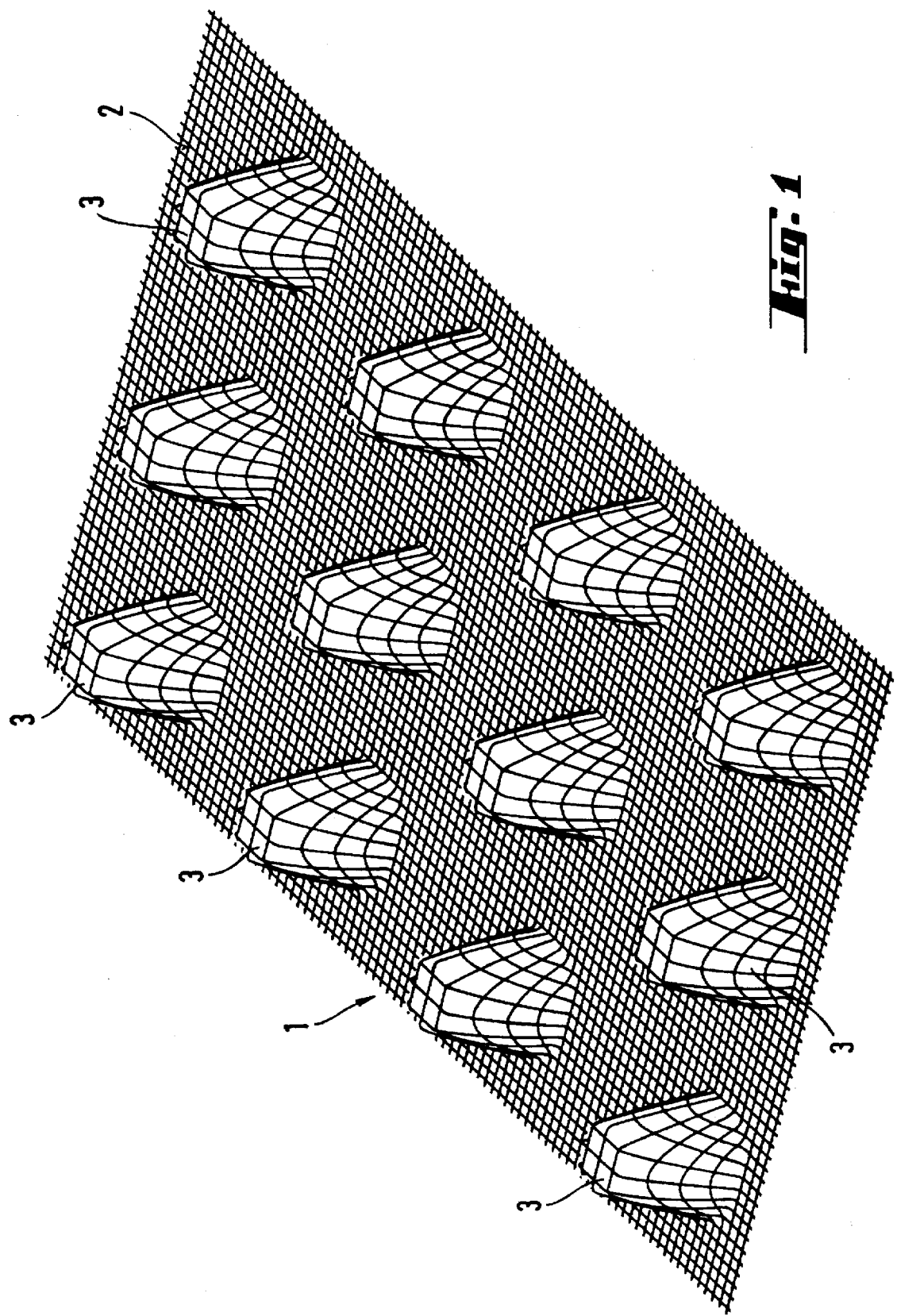

United States Patent [19]

Disselbeck et al.

[11] Patent Number: 5,670,278

[45] Date of Patent: Sep. 23, 1997

[54] SUPPORTS AND ELECTRODES FOR PRIMARY AND SECONDARY ELECTRIC CELLS

[75] Inventors: Dieter Disselbeck, Bad Soden; Herbert Wellenhofer, Bobingen, both of Germany

[73] Assignee: Hoechst Trevira GmbH & Co KG, Germany

[21] Appl. No.: 595,198

[22] Filed: Feb. 1, 1996

[30] Foreign Application Priority Data

Feb. 3, 1995 [DE] Germany .................. 19503447.3

[51] Int. Cl.$^6$ .................................................. H01M 4/74
[52] U.S. Cl. .................... 429/234; 429/243; 429/245; 29/2; 427/121; 427/222; 427/412
[58] Field of Search ........................ 429/234, 241, 429/243, 245; 29/2; 427/121, 222, 389.9, 412

[56] References Cited

U.S. PATENT DOCUMENTS

| | | |
|---|---|---|
| 2,616,165 | 11/1952 | Brennan ................ 429/234 X |
| 2,694,100 | 11/1954 | Zahn . |
| 2,713,078 | 7/1955 | Gros et al. . |
| 3,476,604 | 11/1969 | Faber ..................... 429/241 X |
| 3,516,863 | 6/1970 | Willmann et al. . |
| 3,516,864 | 6/1970 | Willmann et al. . |
| 3,556,855 | 1/1971 | Howells . |
| 3,621,543 | 11/1971 | Willmann et al. ............. 29/2 |
| 3,738,871 | 6/1973 | Scholle . |
| 4,237,205 | 12/1980 | Matter .................... 429/234 |
| 4,464,446 | 8/1984 | Berger et al. .............. 429/190 |
| 4,476,206 | 10/1984 | Viala et al. ............... 429/234 |
| 4,861,690 | 8/1989 | Hole et al. .............. 429/245 X |
| 5,114,812 | 5/1992 | Visselbeck et al. ......... 429/234 |
| 5,434,024 | 7/1995 | Ikeda et al. .............. 429/234 |

FOREIGN PATENT DOCUMENTS

| | | |
|---|---|---|
| 20 17 268 | 11/1990 | Canada . |
| 0 406 910 A1 | 1/1991 | European Pat. Off. . |
| 15 10 123 | 5/1978 | United Kingdom . |

*Primary Examiner*—Stephen Kalafut
*Attorney, Agent, or Firm*—Connolly & Hutz

[57] ABSTRACT

Described is a support for electrodes of primary or secondary electric cells, said support comprising an open-mesh, three-dimensional network structure composed of plastics threads coated unbrokenly with one or more efficiently conducting, thin metal coats and, to form the three-dimensional structure, being provided with humplike depressions and/or elevations which are distributed over its surface and in whose region the distance between the plastics threads is increased, wherein at least the outer metal coat of the plastics threads consists of a valve metal. Also described are electrodes comprising such a support and a process for producing the articles mentioned.

41 Claims, 4 Drawing Sheets

SUPPORTS AND ELECTRODES FOR PRIMARY AND SECONDARY ELECTRIC CELLS

The present invention relates to a support for electrodes for primary or secondary electric cells which consists of an open-mesh, three-dimensional network structure composed of metallized plastics threads, wherein at least the outer metal coat on the plastics threads consists of titanium, and to an electrode, in particular a positive electrode for accumulators, comprising an active material and a novel support which intersperses the active material skeletally.

The electrodes of electric cells, in particular electrochemical storage cells, consist of a positive or negative active material and a support for this material. Customary support materials in accumulators are metallic grids of varying construction. A central concern of the technical further development of electric cells, in particular accumulators, especially with regard to the construction of environmentally friendly electric vehicles, is the reduction of the weight, increase of the current efficiency and the prolongation of the life of the vehicle batteries. A particular concern in this development is to reduce the weight of the electrodes, which is very largely determined by the weight of the support construction for the active materials. In recent developments, for example, a hard lead grid can be replaced by a leaded grid of copper. Similarly, grid constructions composed of metal-coated polymers, for example thermoplastics, which have relatively coarse cells packed with the active electrode materials have already been described in many publications. See U.S. Pat. Nos. 2,694,100, 2,713,078, 3,516,863, 3,516,864, 3,621,543, 3,738,871, 4,237,205, DE-A-25 26 993 and DE-C-1 771 822. However, to the best of our knowledge, none of these constructions has become established in practice, since they are costly to produce, for example by injection molding or other shape-conferring measures, have a higher electric resistance than purely metallic grids and owing to the coarse cell structure entail high internal resistances in the active materials. In addition, the mechanical stabilization of the active materials by such coarse support constructions is not sufficiently ensured. Electrodes consisting of metallized fiber mats (non-wovens) of about 1 to 10 mm thickness packed with active materials are described in DE-A-25 33 408, electrodes composed of metallized wovens or grids packed with active materials are described in EP-B-0 097 090 and U.S. Pat. No. 4,476,206. It is true that these and similar constructions and measures, including for example the embedding of conductive fibers in the active material, yield progress as regards the power-to-weight ratio, i.e. the amount of electric energy to be stored per kg of battery weight, but it still remains desirable to further improve the power-to-weight ratio and the performance characteristics of primary and secondary electric cells.

A very distinct improvement in the power-to-weight ratio is brought about by an electrode construction for primary and secondary electric cells which is known from European patent 0 406 910.

In this known construction, the improvement is achieved by the fact that the electrodes of the electric cells consist of a three-dimensionally deformed, form-stable, conductive network material based on a preferably deep-drawable, optionally resinated textile material and the active material, the active material being interspersed by the electrically conductive network material spatially skeletally.

An electrically conductive network material which in its geometry corresponds to the network material contained in the electrodes known from these European patents is known from DE-A-39 16 713. Its essential feature is a spatial network with open meshes constructed from rods, nodes and voids, so that it is interspersible by other materials, such as, for example, the active electrode material. The electrical conductivity of the network material used is preferably brought about by electrochemical metallization, in particular by coppering with or without additional leading, of its surface.

The appreciable advantages obtained by this electrode construction are essentially ascribable to the use of the network material as support for the active materials:

The dense interspersion of the materials with the metallized support meshes not only provides very good mechanical stabilization of the materials, but also leads to a distinct reduction in the internal resistance of the electrodes because of the short current paths to the nearest metallic collector. In addition, the low weight, compared with a metal grid, of the metallized network material appreciably increases the power-to-weight ratio of the batteries thus produced.

However, it has been found that this support construction from a copperized and optionally additionally leaded network material is highly suitable for producing negative electrodes, but less suitable for producing positive electrodes. This is possibly because the electrochemical reactions at positive electrodes not only convert relatively non-noble metals, for example lead, into oxides, but also lead to a gradual depletion of metal layers composed of nobler metals, such as copper, so that the positive electrode becomes unusable after a relatively short period of operation.

There is therefore an urgent need for further developing this support so that it may also suitable for producing positive electrodes of primary and secondary electric cells.

It has now been found that, surprisingly, such a metallized, open-mesh network support known from the above-cited patents can also be used for producing positive electrodes if the metal layer in contact with the active material and the electrolyte consists of a valve metal, preferably titanium.

Figure 2:
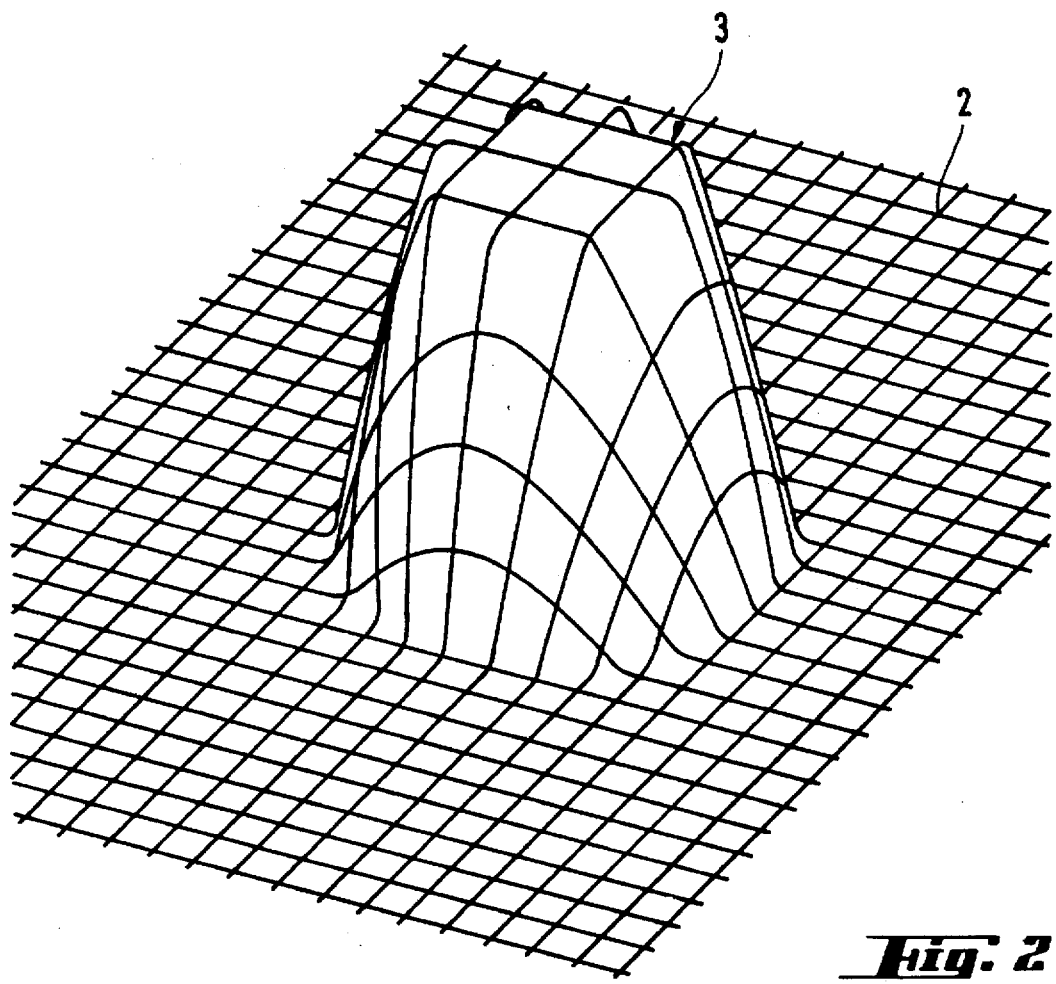

The present invention accordingly provides a support for electrodes of primary or secondary electric cells, said support comprising an open-mesh, three-dimensional network structure composed of plastics threads coated unbrokenly with one or more efficiently conducting, thin metal coats and, to form the three-dimensional structure, being provided with humplike depressions and/or elevations (No. 3 in FIGS. 1 and 2; Nos. 13 and 14 in FIGS. 3 and 4) which are distributed over its surface and in whose region the distance between the plastics threads is increased, wherein at least the outer metal coat of the plastics threads consists of a valve metal.

Valve metals for the purposes of the present invention are metals which, on anodic oxidation in an acid medium, form a dense oxide layer which preferably has adequate electrical conductivity. Such valve metals are metals of groups four B, five B and six B of the periodic table, in particular titanium, zirconium, hafnium, vanadium, niobium, tantalum, molybdenum and tungsten.

Titanium is a particularly preferred valve metal.

The open meshes of the filigreelike net structure of the electrically conductive network material is a characteristic geometric feature of said material.

Preferably the open-mesh network structure consists of a textile sheet three-dimensionally deformed by an area-enlarging, mesh-opening deformation process, for example by deep drawing.

For example, the open meshes of the network structure are formed by using deep drawing to extend the meshes of a sheetlike textile material, such as, for example, of a cross-laid fabric stabilized by extensible weft threads, or of a woven fabric, but in particular of a knitted fabric, such as, for example, a Raschel fabric. If the base material used for the network material is a cross-laid fabric in which the filament bundles cross at about an angle of 5° to 30°, or a woven fabric, it is necessary that the sheetlike textile material should consist of—or at least contain in an effective amount—fibers which themselves show a relatively high extensibility, which may be reversible or irreversible, so that the material be sufficiently deep-drawable. A fiber material of high irreversible extensibility consists for example of partially oriented filaments which are produced by spinning at a relatively high take-off speed. In the case of knitted fabric, by contrast, the deep-drawability is substantially independent of the extensibility of the fiber material. It is therefore preferable to use a knitted fabric as the base for manufacturing the electrically conductive network materials. The fiber material of the sheetlike textile materials is in principle of minor importance. However, it is best selected in such a way that it promises to meet the intended use in the best possible manner. Whereas the physical properties of natural fibers can be influenced only to a limited extent, the physical properties of synthetic fibers can be optimized to the intended use. It is therefore particularly preferable to use synthetic fiber materials, for example polyamides, polyacrylonitrile, polyolefin fibers, but in particular polyester materials, for manufacturing the electrically conductive network materials of the present invention. Particular preference is given here in turn to those grades which exhibit a particularly high mechanical strength. An example of such fiber materials is the commercial product (R)TREVIRA HIGH TENACITY or else end-group-capped polyester materials which are particularly resistant to chemical influences.

The three-dimensionally deformed, electrically conductive network materials are preferably shape-stabilized by an impregnation of the textile material with a thermoplastic or thermosetting resin, in particular if the network materials consist of a fiber material of reversible extensibility. If a partially oriented fiber material having a relatively low softening point is used, it is possible to dispense with a separate resin impregnation, since the thermoplastic filament material itself performs the function of a thermoplastic resin. Accordingly, shape stabilization by a thermoplastic for the purposes of this invention also includes the shape stabilization achieved by the softening of the thermoplastic filaments of the deformed sheetlike textile material. If a reversibly deformable fiber material is used for manufacturing the network material by deep drawing or in the manufacture of the network material by a process other than deep drawing, for example by a special weaving technique, it is likewise in principle possible to dispense with a resination with a thermoplastic or thermosetting resin, since the subsequent metallization will bring about a stabilization of the network structure. However, stabilization by resination or shape stabilization using thermoplastics may be advantageous in the metallization steps for reasons of ease of handling the three-dimensionally shaped network structure. The shape-stabilizing resins preferably present in the network materials can belong to the various known thermoplastic or thermosetting resins so long as their mechanical properties permit the shape stabilization of the network materials of the present invention. Examples of suitable thermoplastic resins are polyacrylates or polyvinyl chloride; however, the preferred resins are thermosetting resins, for example epoxy, melamine and in particular phenolic resins. The amount of resin present in the three-dimensionally deformed network materials is adapted to the weight of the textile material in such a way that deep drawing of the sheetlike textile material causes the meshes to open up to form a filigree network. Suitable add-on levels range from 50 to 500, preferably from 100 to 300, g of resin/$m^2$ of the unstretched textile material. Within these specified ranges the amount of resin is advantageously also adapted to the square meter weight of the deep-drawable textile material. Thus, if a heavyweight textile material is used, the amount of resin employed will be in the upper half of the specified ranges, while in the case of lightweight textile materials it will be in the lower half. The pivotal criterion is, as stated above, the condition that on deep drawing the meshes of the textile material shall open up to form a network. The three-dimensionally deformed network material used as support according to the present invention exhibits a multiplicity of deformations which extend at least in one direction which has a component perpendicular to the original plane of the textile sheet material from which the network material was produced.

Preferably the network material exhibits a multiplicity of elevations in a regular arrangement on a basal area. In a further embodiment, the network material exhibits a multiplicity of elevations and depressions in a regular arrangement on the plane of the original basal area. The elevations and depressions can take the form of wells having a round or angular basal area or for example take the form of webs. The elevations and depressions, however, may also have other shapes from case to case, for example the shape of cones or truncated cones, pyramids or truncated pyramids having a varyingly polygonal base, cylinder, prisms, spherical segments, etc. It is also particularly preferable for the apex points or areas of the elevations to be all within one plane and parallel to the basal area, which mutatis mutandis also applies to the depressions.

It is also of advantage for the number, size, shape and spatial arrangement of the deformations per unit area of sheet material to be selected in such a way as to maximize the arithmetic product of the size of the area remaining after the deformation of the original plane and the size of the plateau surfaces of the elevations or the product of the size of the plateau surfaces of the elevations and the bottom surfaces of the depressions. It is further of advantage for the number, size, shape and spatial arrangement of the deformations per unit area of sheet material to be selected in such a way as to offer an optimum degree of adhesion to the particular active material used, regardless of its porosity or other consistency.

The network material used as support in these electrodes can of course also exhibit other three-dimensional deformations. It is perfectly possible for the surface of the original textile material to disappear completely in the three-dimensionally deformed network material according to the present invention if, for example, the material is deep-drawn with rams from both sides of the textile sheet material in such a way that well- and hat-shaped deformations alternate up and down in the material.

FIG. 1 illustrates schematically a section of a network material (1) whose basal area (2) exhibits a multiplicity of hat-shaped elevations (3).

FIG. 2 schematically depicts in enlargement one of the hat-shaped deformations and clearly shows the dramatic widening of the mesh structure of the textile material which occurs in the region of the deformation.

Figure 3:
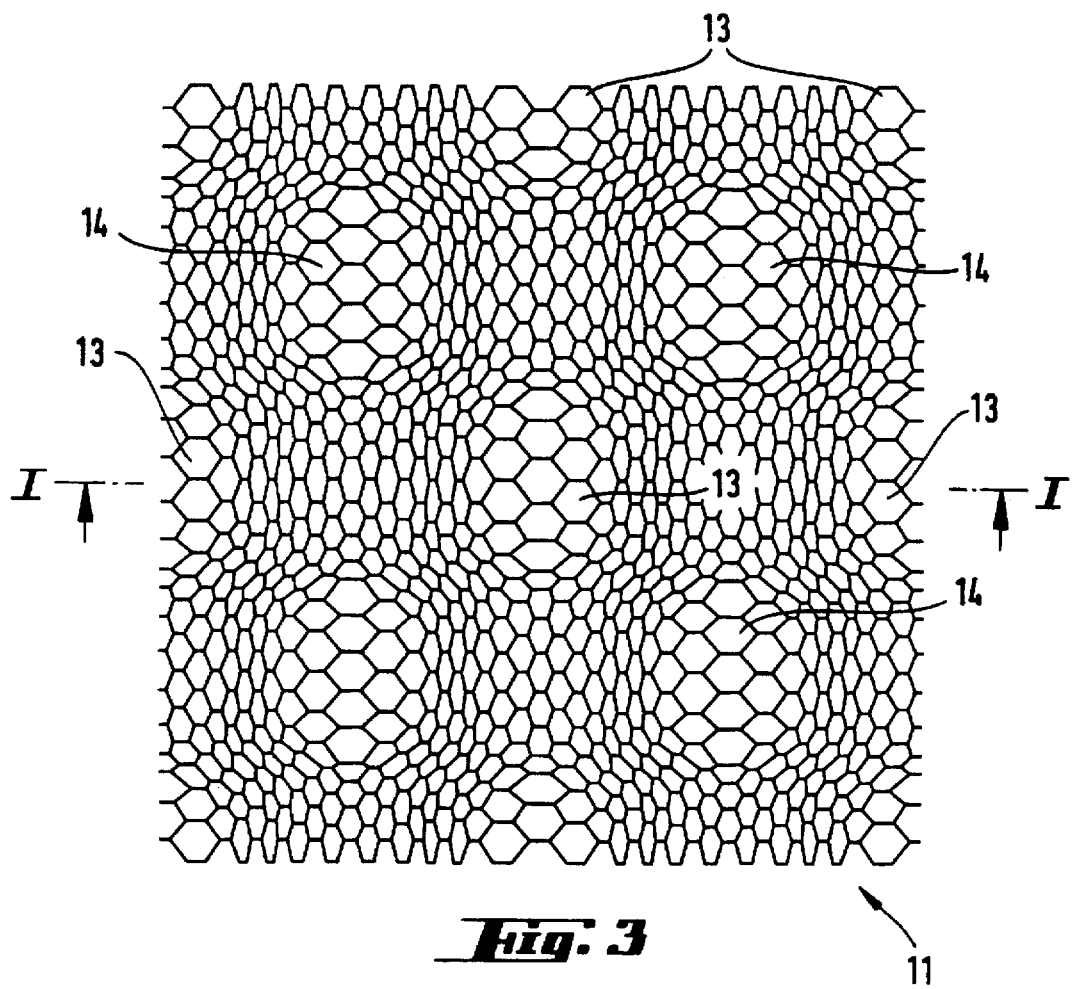

FIG. 3 shows in a perpendicular plan view a section of a network material (11) which exhibits a regular arrangement of elevations (13) and depressions (14) and which is based on the network material which is obtained when, for example, the material is deep-drawn by rams from both sides of the textile sheet material.

Figure 4:
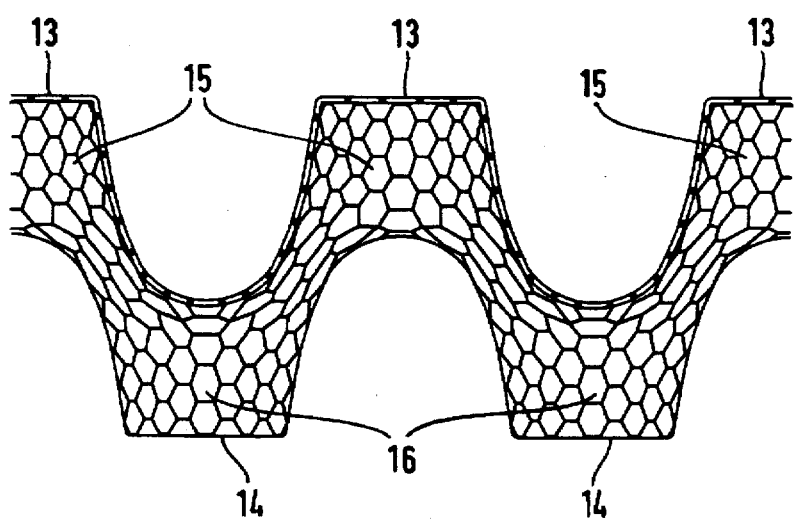

FIG. 4 shows a plan view of sectional area I—I of the network material (11) of FIG. 3 with the cut resin-stiffened yarns of the network structure, depicted as small hatched circles, and the elevations (13) and depressions (14). The network in the regions (15) of the illustration represents the inner surfaces of the out-open elevations (13), while the network in the regions (16) of the illustration represents the outer surface of the depressions (14) lying behind the line of section.

The good support for the active material is also the consequence of the depressions (14) and the elevations (13) themselves, which enclose the material from virtually all sides except for the side facing away from the plate plane. The width of the elevations (13) and of the depressions (14) is within the range from 3 to 10 mm, in particular 4 to 6 mm. The depth of the elevations (13) and depressions (14) is 1 to 5 mm, in particular 2 to 3 mm. The ratio of width to depth should be within the range 2:1 to 3:1. In this respect the depth of the elevations (13) and of the depressions (14) is shown exaggeratedly in the figures for reasons of a clear depiction of the deformation principle. Of particular advantage with the embodiment depicted in FIGS. 3 and 4 is that the adjacent elevations (13) and depressions (14) are immediately adjoining so that the plastics network is also two-dimensionally drawn in the boundary regions of adjacent elevations (13) and depressions (14) and the enlarged meshes are present there. The alternating of elevations (13) and depressions (14) drawn in opposite directions creates a support particularly suitable for receiving large amounts of active material, providing a particularly good mechanical support for the active material and achieving a short-path conduction of current from and into the active material.

The original textile sheet may also be pulled out from both sides by a multiplicity of narrow rams which extend in the same longitudinal direction to form a zigzag surface and stabilized in that form. Of particular preference, however, are the forms of the network material schematically depicted in FIGS. 1 to 4, featuring cuplike elevations with or without depressions. What is essential, as stated above, is that the cuplike deformations form small cells which provide very good mechanical support of the active materials, that the materials present in the individual cuplike cells communicate with one another through the open meshes of the supporting network, and that the current paths in the active material to the nearest part of the network are short.

The above-described process, for producing the network material contained in the electrodes of the present invention, by deep drawing a deep-drawable sheetlike textile material, is a particularly advantageous way of embodying the present invention. However, the network can of course also be produced using other shape-conferring processes, for example special weaving or knitting processes, which are suitable for manufacturing a textile material, optionally shape-stabilized with a thermosetting or thermoplastic resin and which, as described above, is spatially deformed and has the characteristic open-mesh net structure of the network material producible by deep drawing.

A network material used as support for an active material has to have very good electrical conductivity. Very good results concerning conductivity are achieved by metallizing the surface of the network material. The network structure of the active-material support of the present invention is therefore unbrokenly coated with one or more coats of electrically efficiently conducting metals, preferably with a coat of an electrically efficiently conducting, ideally ductile metal, onto which, according to the invention, a valve metal coat, for example a titanium coat, has been applied as outer metal coat. The metal coats, preferably a copper coat, which underlie the valve metal coat, preferably titanium coat, and which essentially conduct the current are hereinafter referred to together as conducting layer.

The thickness of the conducting layer is 5 to 300, preferably 10 to 100, μm. In particular, the conducting layer of the active-material support of the present invention is formed by metals which, in the electrochemical series, have a standard potential with reference to hydrogen of from −1.3 to +1.6, preferably from −0.8 to 1.6, V. Ductile metals are particularly favorable for this, as mentioned above. The electrically conductive coating of metal on the network material of the present invention, the conducting layer, can consist of one or more coats; for instance, a first coat of copper may be followed by a coat of a noble metal, or a relatively thin coat of copper or nickel may be followed by a thicker coat of another metal, for example silver, lead, tin or gold.

The electrically conducting coating of metal on the network material of the present invention can also consist of a mixture of different metals, preferably those which form alloys with one another.

Preference for the conducting layer of the network material of the active-material support of the present invention is given to copper, nickel or silver, although copper is particularly preferred not only for technical but also for economic reasons.

However, it may be emphasized that, regardless of the construction of the conducting layer, the outer metal coat of the metal coating of the active-material support of the present invention consists of a valve metal, preferably titanium.

Preferably, the coat next to the polymer material of the network material is a relatively thin, electrically conductive coat whose construction differs from that of the conducting layer generally either in respect of its chemical nature or its structure. This electrically conducting base layer underlying the conducting layer is preferably a metal coat a few μm, advantageously from 0.5 to 2 μm, in thickness, of chemically reductively or vapor-deposited gold, nickel or preferably copper, or else a layer of other electrically conductive substances such as conductive carbon black, graphite or metal powders, which can also be resin-bound, or an electrically conductive polymer layer. A preferred nonmetallic conductive base layer consists of a layer of polypyrrole deposited on the network material.

The valve metal layer, preferably of titanium, lying on top of the conducting layer of the active-material support of the present invention makes it possible to use the support for manufacturing positive electrodes. It prevents the corrosive depletion of the conducting layer in the course of the forming and charging of the secondary electric cell. It is therefore necessary that this titanium layer should cover the conducting layer unbrokenly and seal it off against the attack of the electrolyte and of the electrode reaction taking place in the active material. It has been found that the titanium layer should at least have a thickness of 0.01 μm to form an effective protection for the conducting layer. Preferably the titanium layer has a thickness of above 0.03 μm, in particular of 0.03–0.1 μm. Preferably the valve metal layer, for example the titanium layer, is surface-passivated. Particular preference is given to an electrochemically produced layer of passivation. The layer of passivation has virtually no reducing effect on the conductivity of the valve metal coating, for example the titanium coating. This is surprising since for example the layer of passivation formed on aluminum in the course of anodic oxidation has a very high electrical resistance which completely prevents a flow of current.

The active-material supports of the present invention conform exactly, in terms of mesh structure and surface topography, to the network materials used in their manufacture. An example of the mesh structure and of the geometric form of the active-material supports of the present invention are thus shown in FIGS. 3 and 4. The difference between the network materials and the active-material supports of the present invention is merely that the threads of the grid net are metallized in a manner according to the present invention.

Figure 5:
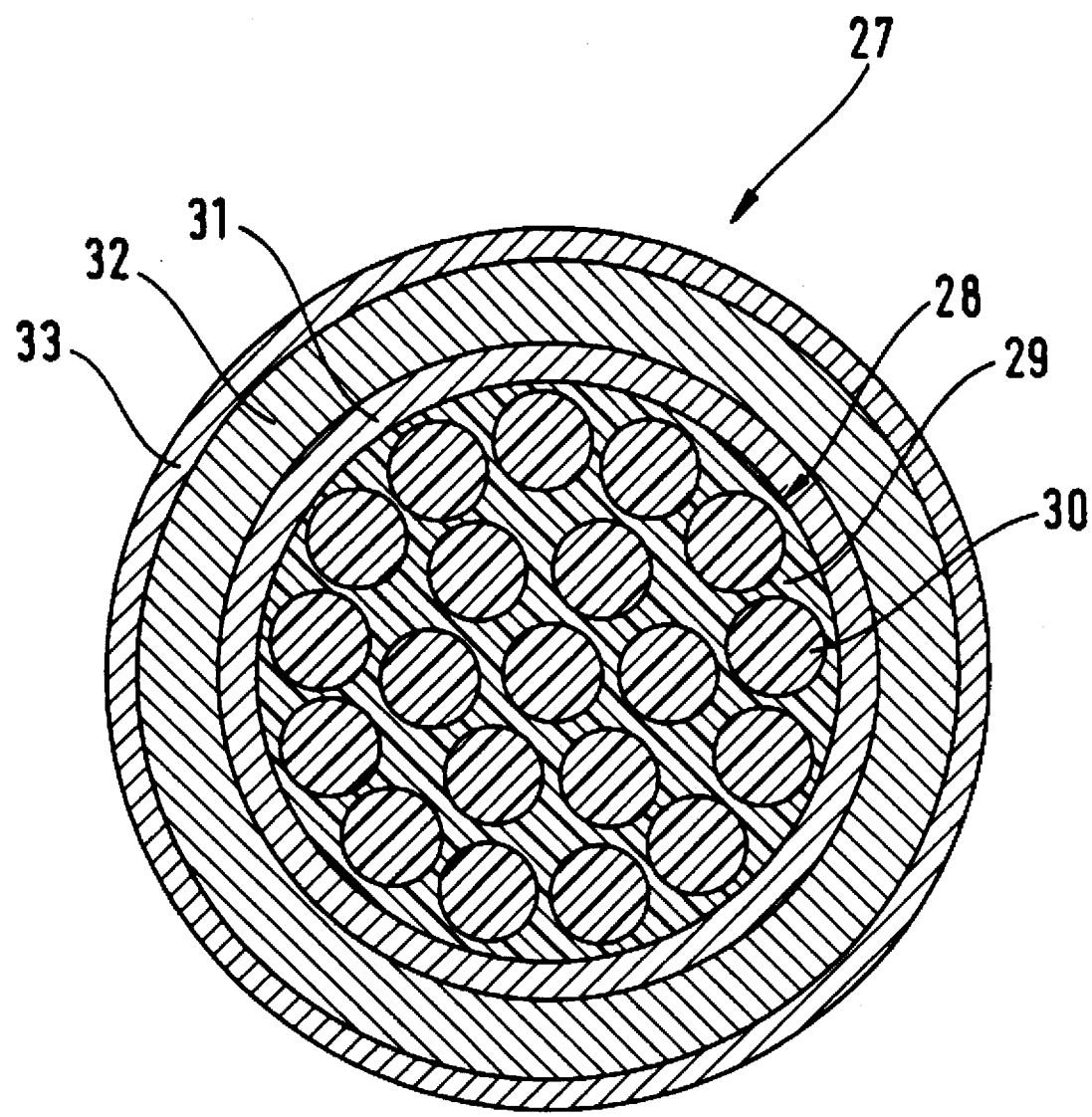

FIG. 5 shows a cross-section through a metallized thread (27) of the active-material support with the textile core (28), consisting of a resin matrix (29) embedding the synthetic filaments (30), the overlying electrically conducting base layer (31), the metallic conducting layer (32) and the protective titanium layer (33).

If the active-material support of the present invention is to be used for constructing positive electrodes for lead accumulators, it will further be particularly advantageous to generate a lead dioxide layer on the valve metal layer, preferably the titanium layer. This lead dioxide layer establishes an excellent connection to the active lead dioxide material of the positive accumulator plate and, what is more, forms an additional protection against mechanical and corrosive damage to the underlying metal layers. If desired, a layer of lead may additionally be arranged as connecting layer between the layer of valve metal and the $PbO_2$ layer.

The thickness of the lead dioxide layer deposited on the valve metal layer, preferably the titanium layer, is uncritical. It is advantageously about 10 to 500 μm.

If the titanium-coated active-material support of the present invention is to be used for manufacturing negative electrodes, it is advantageous to effect the coating with a titanium which has been passivated with small amounts of oxidizing metal ions. Examples of such metal ions are $Cu^{2+}$, $Fe^{3+}$ and $Cr^{4+}$.

To manufacture the active-material support of the present invention, it is first necessary to manufacture the three-dimensionally deformed network material. For this, the sheetlike, deep-drawable textile material whose threads may contain metal filaments, preferably the knitted fabric, is impregnated with one of the above-mentioned resins suitable for the mechanical stabilization of the deformations, which may be filled with an electrically conductive filler. The resins can be applied to the textile material in a conventional manner by brushing, rolling, knife-coating, padding or particularly advantageously by dipping. The resin-coated fabric is then advantageously squeezed off with a pair of squeeze rolls to the desired resin pick-up. Thermoplastic resins are advantageously applied in the impregnating step in the form of solutions or of emulsions, or they are incorporated in the form of bonding filaments into the yarn used for producing the deep-drawable sheet material. Heat-curable (thermosetting) resins are advantageously used in the commercial form as highly concentrated aqueous solutions or dispersions.

After a possible intermediate drying of the resin-impregnated textile material, it is subjected to the area-enlarging deformation process, preferably the deep-drawing process, at elevated temperature. The deep-drawing temperature is chosen in such a way that thermoplastic resins can be melted and completely intersperse the threads of the network structure. The same is true of thermosetting resins; in this case the temperature of the deep-drawing means is adjusted in such a way that the flowable range of the thermosetting resin is reached. After the resin has melted, the temperature of the deep-drawing means is controlled in such a way that the impregnating resin can harden. If thermoplastics are used, this requires the temperature to be reduced to below the melting point of the thermoplastics; in the case of thermosetting resins, the temperature of the deep-drawing means can in general remain unchanged since the hardening (curing) of thermosetting resins also takes place at elevated temperature. The deep-drawing means is kept closed until the stabilizing resin is completely hard or at least sufficiently hard for the structure of the textile material produced by the deformation process, preferably the deep drawing, to remain stable. Instead of impregnation of the deep-drawable textile material with thermoplastic or thermosetting resins, it is also possible for the unimpregnated textile material to be deformed together with an appropriate film of the resin, in which case the conditions are to be chosen as indicated above. The resin film melts in the course of this process, is absorbed by the yarns of the network, and hardens as indicated above. The basis weight of the film is naturally chosen so as to produce the above-indicated resin content of 50 to 500 $g/m^2$ in the network material.

After the three-dimensionally deformed network material has been produced, it is metallized at the surface by electrolytic deposition of a metal layer in a thickness sufficient for conductivity. If the network material already possesses conductivity, for example because of fiber materials which contain metal filaments or because of the use of a conductified resin, sufficient to electrodeposit a conducting layer thereon, this electrodeposition can be carried out as indicated below without further preparations.

It is particularly preferable, however, first to apply a conductive base layer to the non-electrically-conductive network material. For this the network material is prepared in a conventional manner for the actual metallization by activation with a noble metal ion solution or a noble metal colloid, with or without a subsequent acceleration treatment in an aqueous acid, for example hydrofluoric boric acid, sulfuric acid, hydrochloric acid or oxalic acid. This is followed by the unbroken deposition of a coating of metal, for example a coating of copper, nickel or gold, on the thus pretreated network material. The deposition of a metal is effected by treating the pretreated network material with an aqueous solution containing the metal ions in question and a reducing agent, in practice usually formaldehyde, a hypophosphite or an alkali metal boranate. In special cases, for example if so required by the plastics surface of the network threads or if particularly high demands are placed on the adhesion of the coating of metal, it is advantageous to preprepare the network material for activation by treatment with a swelling agent, for example acetone, ethyl acetate, trichloroacetone or trichloroacetic acid, and pickling with an aqueous solution which customarily contains from 300 to 900 g/l of chromic acid with or without sulfuric acid. It is particularly surprising that this swelling and pickling treatment can in general be dispensed with in the metallization of the network materials.

Preferably, the activation (nucleation) of the network material is preceded by a thorough cleaning of the surface. This can take the form for example of a treatment with an aqueous alkaline surfactant solution, for example a commercially available conditioner. A clean in a hot (40°–70°

C.) water bath under the action of ultrasound has proved particularly advantageous. Here the use of deionized water is particularly advisable.

Instead of this chemical deposition of a metal film, it is also possible to carry out a vapor deposition coating of the three-dimensionally deformed network material in a high vacuum or by cathode sputtering with the desired metal, in which case care has to be taken to ensure that the entire surface area of the network material is vapor deposited unbrokenly, since this is the only way of effecting an unbroken electrodeposition of the conducting layer.

The deposition of the metal layer as an electrically conducting base layer can be dispensed with entirely if the network material, for example by the process described in DE-A-33 21 281 or EP-A-0 206 133, is coated with a layer of an electrically conductive polymer, for example with a layer of polypyrrole as per Example 1 of EP-A-0 206 133, or else if an unbroken layer of other electrically conductive substances, such as conductive carbon black, graphite or metal powder is used, which can also be resin-bound, is applied.

Thereafter the relatively thin electrically conducting base layer consisting of a chemically deposited metal layer or polymer layer, for example the polypyrrole layer, has deposited on it electrolytically in a conventional manner the conducting layer of the same or another metal in a thickness from 5 to 300 µm.

The network material can also be exclusively metallized to the desired thickness of the conducting layer by the above-described chemical metal deposition technique. Here the thickness of the metal coat naturally depends on the length of time the network material is exposed in the metallizing bath. In general, about 2–6 µm of metal film can be deposited per hour.

Preference, however, is given to the chemical production of a metal film of copper or nickel in a thickness of 0.5 to 2 µm and a subsequent electrolytic metallization, for example with chromium, copper, nickel, lead, lead/tin, tin or gold, preferably with copper, up to thickness of the coating of metal forming the conducting layer of up to 300, preferably 10 to 100, µm. If a combined chemical and electrolytic metallization is carried out, particular preference is given to the chemical deposition of a copper film, because copper is very ductile and has a particularly easily activated surface.

Following the preferably electrolytic production of the conducting layer, the present invention proposes that the coating of valve metal, preferably titanium, be applied thereon in a thickness of at least 0.01 µm, preferably from 0.03 to 0.1 µm. The valve metal layer, preferably of titanium, can be applied by vapor deposition in a high vaccum at below $10^{-4}$ mbar if the known conditions for an unbroken uniform deposition of the metal film on the network are observed. A much better option, because it is better adapted to the network structure, is the unbroken application of the valve metal film, preferably of titanium, by ion plating in an inert gas, since not only the charge of the substrate at a negative potential but also the higher gas pressure of $10^{-2}$ to $10^{-3}$ mbar in the plasma (shorter free path of the metal ions) bring about a more uniform deposition of the metal film on the network. It is particularly preferred to produce the valve metal film, preferably the titanium film, by cathode sputtering in an inert gas, since here too the electric field and the somewhat higher gas pressure lead to a uniform application of the titanium layer. Another factor is the relatively rapid build-up to the layer thickness required. A good overview of the known ways of producing the valve metal layer, preferably the titanium layer, of the active-material support of the present invention outlined here may be found for example in Ullmanns Encyklopädie der technischen Chemie, 4th edition, Volume 10, pages 257 ff., in particular pages 257–260, with references to further literature and primary literature.

The passivation of the valve metal layer, for example the titanium layer, is preferably effected by electrolytic oxidation and, if the active-material support is incorporated in a positive plate, can be effected simultaneously with the formating thereof.

An optionally desired, additional layer of $PbO_2$ can be produced on the valve metal layer, for example the titanium layer, for example by applying to the valve metal layer, for example the titanium layer, a thin layer of lead, for example by briefly dipping into a lead melt, by spraying or by cathode sputtering, and the layer of lead subsequently being completely or partially anodically oxidized to $PbO_2$. The anodic oxidation of the layer of lead can likewise be carried out simultaneously with the formating of the plate.

Further ways of applying the $PbO_2$ layer consist in the electrolytic deposition of $PbO_2$ from an alkali metal plumbate(II) solution or from an aqueous solution of lead nitrate containing urea and copper nitrate.

The present invention further provides electrodes, in particular positive electrodes for primary and secondary electric cells, comprising one of the above-described active-material supports.

Particular preference is given to lead accumulator positive electrodes comprising an active-material support of the present invention.

To manufacture the electrodes of the present invention, first a fitting cut of the active-material support of the present invention is provided with current supplier and collector tabs and optionally a conductive frame. Thereafter a paste of lead powder, lead oxide powder and dilute sulfuric acid, optionally additionally admixed with auxiliaries and additives customary in materials for positive plates, for example fiber short-cut, is introduced into the skeleton of the active-material support of the present invention. Suitable for this purpose are all materials preparable with a pasty or creamy consistency. In particular in the manufacture of electrodes for lead accumulators it is possible to use a material having a density from 3 to 5.7 g/ml. The paste can be pasted in either by hand or by machine. To improve the distribution of the active material, the use of ultrasound for the transient liquefaction of the active material is possible.

In particular in the case of networks which are dense and/or deep-drawn in two directions, it is of advantage to apply the paste from both sides in order to ensure complete envelopment of all the network parts. Furthermore, complete encasement of a dense network can be effected by using more liquid mixtures and subsequently squeezing off with an absorbent web material which can later be used as an acid reservoir in the ready-produced cell.

After the pasting in of the active material into the active-material support of the present invention, the electrode is stored for some time, for example some hours or a few days, to ripen and then formated by repeated charging and discharging, in which it is connected as positive electrode.

The novel construction of the electrodes of the present invention ensures essentially that they have a lower weight, a higher power rating and a higher mechanical strength. The lower weight compared with known embodiments is the result of the fact that the conductive network support material consists in the main of synthetic threads and resins with only a thin coat of metals. In the preferred embodiment, the thread material consists of polyester having a specific gravity of about 1.4 g/cm$^3$. Similarly, the preferred resin has a density of about 1.4 g/cm$^3$. By comparison, lead has a specific gravity of 11.3 g/cm$^3$ and a lead grid support for the active material, for example in a starter battery, has a weight of 90 grams. If the support for the active material consists of the above-described network material, the weight saved in the case of an 88 Ah starter battery is from one to two kilograms. The crucial aspect of a starter battery is its starting power, i.e. the high current dischargeability of the battery. This power is decisively determined by the internal resistance of the battery, which in turn depends on the plate thickness which, if network materials are used, is no longer subject to the injection-molding restrictions of prior art grids. Since, in addition, the active material is skeletally interspersed by the filigree structure of the network, an improved cross current distribution and hence better utilization of the active material is present as well as the reduced internal resistance.

The reduced voltage drop in the cell also reduces the amount of heat lost. This has a beneficial effect on battery life. Altogether, the use of the conductive plastics network material results in a higher energy density per unit weight compared with conventional designs based for example on lead/acid-Ni/Cd or Ni/Fe cells. Compared with conventional electrode plates, those formed from network materials also have the advantage of greater mechanical stability. Owing to its structure, the network material not only supports the active material but also intersperses it spatially like a skeleton and reinforces and stabilizes it in this manner against impact and shock and also against deformation on heating. This in turn reduces the risk of the active material dropping off the support and accumulating as sludge at the bottom of the battery and reducing the performance of the battery or making it unusable.

What is claimed is:

1. A support for positive electrodes of primary or secondary electric cells, said support comprising an open-mesh, three-dimensional network structure composed of plastics threads coated unbrokenly with one or more conducting, metal coats and, to form the three-dimensional structure, being provided with humplike depressions and/or elevations which are distributed over its surface and in whose region the distance between the plastics threads is increased, wherein at least the outer metal coat of the plastics threads consists of a valve metal.

2. The support of claim 1 wherein the open-mesh network structure consists of a textile sheet three-dimensionally deformed by an area-enlarging, mesh-opening deformation process.

3. The support of claim 1, wherein the open-mesh network structure consists of a textile sheet three-dimensionally deformed by deep drawing.

4. The support of claim 1, wherein the network structure has been shape stabilized with a thermoplastic or a thermosetting resin.

5. The support of claim 1, wherein the network structure has been coated with a conducting layer composed of one or more electrically conducting metal coats with a valve metal layer applied thereto as outer metal coat.

6. The support of claim 5, wherein the conducting layer is a copper layer.

7. The support of claim 1, wherein the valve metal is titanium.

8. The support of claim 1, wherein an electrically conducting base layer of electrolessly deposited metals, is present between the plastic of the network structure and the conducting layer.

9. The support of claim 1, wherein an electrically conducting base layer of polypyrrole is present between the plastic of the network structure and the conducting layer.

10. The support of claim 1, wherein an electrically conducting base layer of conductive carbon black, graphite or metal powders, is present between the plastic of the network structure and the conducting layer.

11. The support of claim 1, wherein the valve metal layer has a layer thickness of >0.01 µm.

12. The support of claim 1, wherein the valve metal layer is passivated.

13. The support of claim 1, wherein the valve metal layer is electropassivated.

14. The support of claim 1, wherein the valve metal layer is additionally coated with a layer of PbO$_2$.

15. The support of claim 1, wherein a layer of lead is present between the valve metal layer and the PbO$_2$ layer.

16. An positive electrode for primary or secondary electric cells comprising a support and an active material, the support consisting of an open-mesh, three-dimensional network structure composed of plastics threads coated unbrokenly with one or more conducting, metal coats and, to form the three-dimensional structure, being provided with humplike depressions and/or elevations which are distributed over its surface and in whose region the distance between the plastics threads is increased, said support interspersing the active material skeletally, wherein at least the outer metal coat of the plastics threads consists of a valve metal.

17. The electrode of claim 16, wherein the open-mesh network structure of the support consists of a textile sheet three-dimensionally deformed by an area-enlarging deformation process.

18. The electrode of claim 16, wherein the open-mesh network structure has been shape-stabilized with a thermoplastic or a thermosetting resin.

19. The electrode of claim 16, wherein the open-mesh network structure of the support has been coated with a conducting layer composed of one or more electrically conducting metal coats with a valve metal layer applied thereto as outer metal coat.

20. The electrode of claim 16, wherein the conducting layer is a copper layer.

21. The electrode of claim 16, wherein the valve metal is titanium.

22. The electrode of claim 16, wherein an electrically conducting base layer of electrolessly deposited metals, is present between the plastic of the network structure and the conducting layer.

23. The electrode of claim 16, wherein an electrically conducting base layer of polypyrrole is present between the plastic of the network structure and the conducting layer.

24. The electrode of claim 16, wherein an electrically conducting base layer of conductive carbon black, graphite or metal powders, is present between the plastic of the network structure and the conducting layer.

25. The electrode of claim 16, wherein the valve metal layer has a layer thickness of >0.01 µm.

26. The electrode of claim 16, wherein the valve metal layer is passivated.

27. The electrode of claim 16, wherein the valve metal layer is electropassivated.

28. The electrode of claim 16, wherein the valve metal layer is additionally coated with a layer of PbO$_2$.

29. The electrode of claim 16, wherein a layer of lead is present between the valve metal layer and the PbO$_2$ layer.

30. A process for positive producing a support for electrodes of primary or secondary electric cells by impregnating a sheetlike, deep-drawable, optionally electrically conductive textile material with a resin suitable for mechanically stabilizing the deformations and optionally filled with an electrically conductive filler, optionally intermediately drying the resin-impregnated textile material, deforming the resin-impregnated textile material into a three-dimensional structure with humplike depressions and/or elevations which are distributed over its surface in whose region the distance between the plastics threads is enlarged, by an area-enlarging deformation process at elevated temperature at which the resins melt, the temperature of the deforming apparatus being subsequently controlled so that the impregnating resin can harden, subsequent metallization of the resulting three-dimensionally deformed network material by a) if necessary application of an electrically conducting base layer of metal or a layer of a different electrically conductive substance and b) electrolytic deposition of a metal coat from 5 to 300 µm thickness as conducting layer, which comprises subsequently applying a valve metal layer in a thickness of at least 0:01 µm, to the metallic conducting layer.

31. The process of claim 30, wherein a knitted fabric is subjected to the area-enlarging deformation process.

32. The process of claim 30, wherein an electrically conducting base layer of electrolessly deposited metals, is applied between the plastic of the network structure and the conducting layer.

33. The process of claim 30, wherein an electrically conducting base layer of polypyrrole is applied between the plastic of the network structure and the conducting layer.

34. The process of claim 30, wherein a layer of conductive carbon black, graphite or metal powders, is applied as the electrically conductive base layer.

35. The process of claim 30, wherein a titanium layer is applied as the valve metal layer.

36. The process of claim 30, wherein the valve metal layer is applied unbrokenly to the support network in an electrically generated plasma.

37. The process of claim 30, wherein the valve metal layer is applied by ion plating, cathode sputtering in an inert gas Or by vapor deposition in a high vacuum.

38. The process of claim 30, including electropassivating the valve metal layer.

39. The process of claim 30, including electrolytically depositing $PbO_2$ on the valve metal layer.

40. The process of claim 39, including coating a layer of lead between the valve metal layer and the $PbO_2$ layer.

41. The process of claim 30, including electropassivating the valve metal layer, and wherein the depositing of the $PbO_2$ layer and the passivating of the valve metal layer are carried out simultaneously.

* * * * *

UNITED STATES PATENT AND TRADEMARK OFFICE
CERTIFICATE OF CORRECTION

PATENT NO. : 5,670,278
DATED : September 23, 1997
INVENTOR(S) : Dieter Disselbeck, et al It is certified that error appears in the above-identified patent and that said Letters Patent is hereby corrected as shown below:

Column 5, line 8, after "circles" insert -- (17) --; and in line 10, "out-open" should read -- cut-open --.

Column 12, line 66 (penultimate line), "for positive producing a support for" should read -- for producing a support for positive --

Column 14, line 15 (claim 37, line 3, "Or" should read -- or -- and line 23 (claim 41, line 1), "30" should read -- 39 --.

Signed and Sealed this

Twenty-third Day of December, 1997

Attest:

BRUCE LEHMAN

Attesting Officer

Commissioner of Patents and Trademarks